July 10, 1923.

W. N. SPRINGER

TRACTOR

Filed Aug. 16, 1919

Inventor
William N. Springer
By his Attorneys
Blackmore, Spencer & Flint

July 10, 1923. 1,461,714
W. N. SPRINGER
TRACTOR
Filed Aug. 16, 1919    4 Sheets-Sheet 4
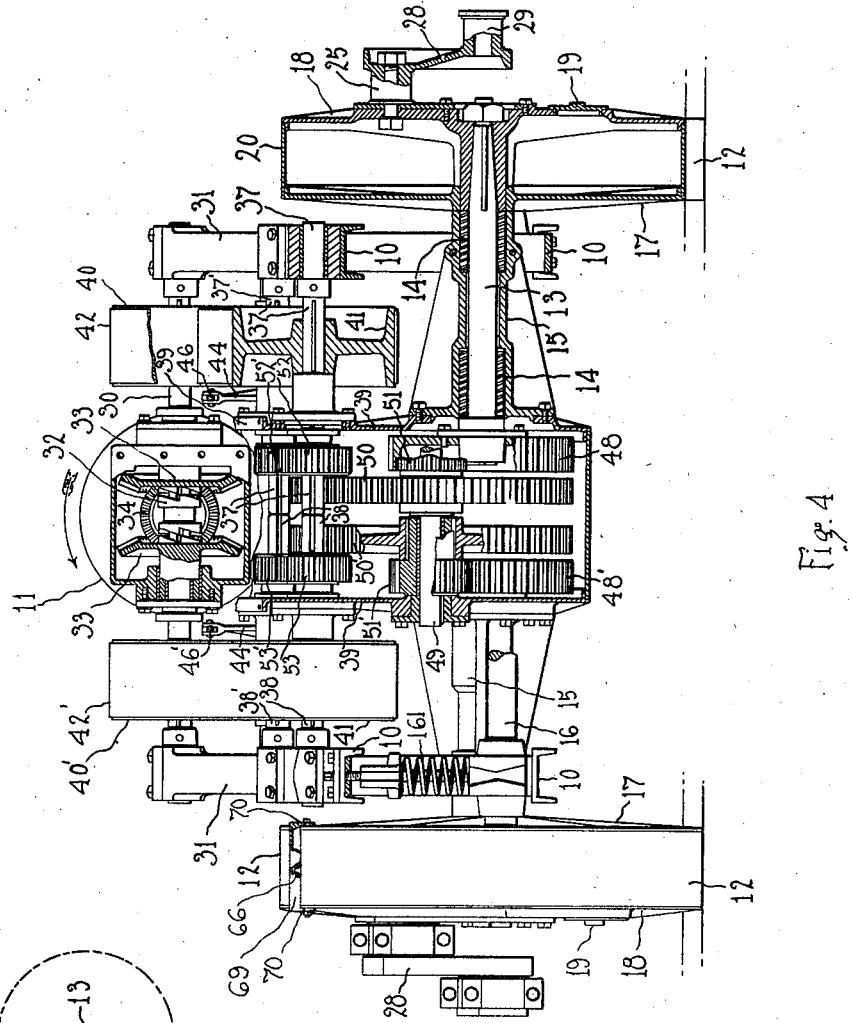

Patented July 10, 1923.

1,461,714

UNITED STATES PATENT OFFICE.

WILLIAM N. SPRINGER, OF JANESVILLE, WISCONSIN, ASSIGNOR TO GENERAL MOTORS CORPORATION, OF DETROIT, MICHIGAN, A CORPORATION OF DELAWARE.

TRACTOR.

Application filed August 16, 1919. Serial No. 317,922.

*To all whom it may concern:*

Be it known that I, WILLIAM N. SPRINGER, a citizen of the United States, and resident of Janesville, Rock County, State of Wisconsin, have invented certain new and useful Improvements in Tractors, of which the following is a specification.

My invention relates to self-propelled vehicles of the tractor type or class, and particularly to tractors designed for use in hauling agricultural implements; although tractors made in accordance with my invention may be and commonly are used for general hauling purposes, and are not limited in their use to the hauling of any particular kind or class of machine or device.

The principal object of my invention is to provide an improved tractor which may be more readily controlled, so far as concerns its direction of travel and the starting and stopping thereof, than has heretofore commonly been the case; and which may be turned at a more acute angle, or completely turned around within a smaller space, and which in general is under the control of the operator to a greater degree than has been the case in tractors heretofore in use.

A further object of my invention is to provide improved transmission mechanism through which the driving wheels of the tractor are driven from the engine which drives the machine; said transmission mechanism being of such character, construction, and operations as to better provide for the control of the machine, particularly so far as concerns its direction of travel and the turning about thereof, and of such character as to also secure a more complete and effective control of the rate of travel or speed of the tractor than has commonly been the case in tractors.

A further object of my invention is to provide a tractor having three driving wheels upon each side thereof, the middle one of the set of wheels upon each side, however, being out of contact with the ground when the tractor is traveling over hard roads or over hard ground, but which center driving wheels are in contact with the ground and act in conjunction with the end wheels when the tractor is moving over soft ground.

A further object of my invention is to provide an improved construction and arrangement of driving wheels, and improved driving mechanism for communicating motion thereto, whereby increased tractive effort or draw bar pull is secured.

With the above and other objects of invention in view, my invention consists in the improved tractor and subordinate mechanisms and features thereof illustrated in the accompanying drawings and hereinafter described and claimed; and in such variations and modifications thereof, within the scope of the concluding claims, as will be obvious to those skilled in the art to which my invention relates.

In the drawings accompanying and forming a part of this specification and wherein the preferred embodiment of my invention is illustrated, and wherein the various parts thereof are designated by like reference numerals in the several views, Figure 1 is a view showing my improved tractor in side elevation.

Figure 4 is a view showing my invention partly in section upon transverse vertical planes, and partly in end elevation, the details of certain portions of the transmission mechanism being particularly shown in this view.

Figure 5 is a schematic view illustrating certain features of my invention.

Figure 6 is a perspective view illustrating an element designed to be secured to the periphery of the driving wheels to thereby prevent slipping of the wheels.

Figure 1:
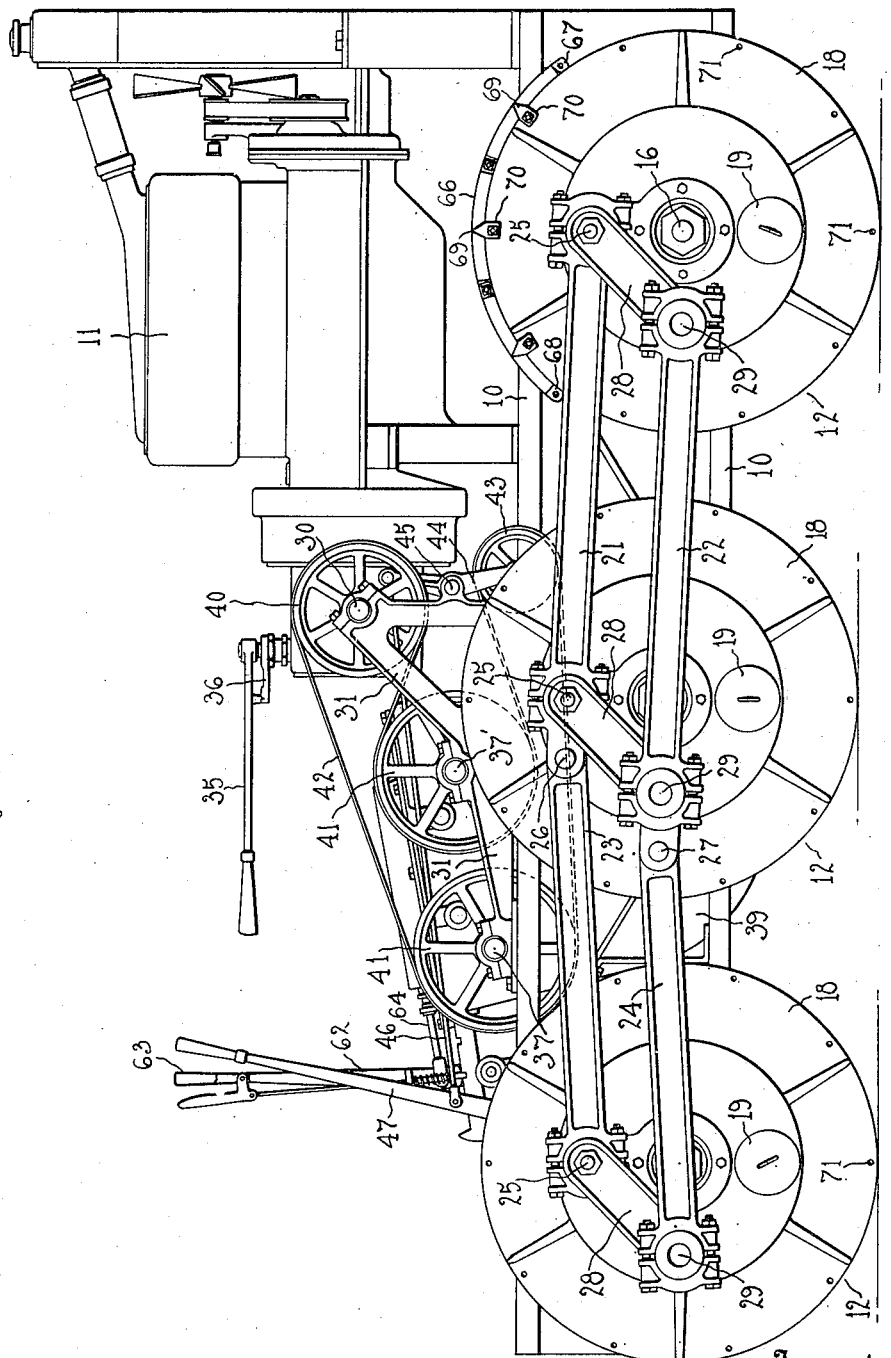

Referring to the drawings, the reference numeral 10 designates the main frame of my improved tractor which serves to support the various elements which collectively comprise the same in proper relation one to another; and 11 designates the engine whereby the tractor is propelled and which is supported by and from the frame in any appropriate manner, as will be appreciated. The driving wheels of the tractor are designated by the reference numerals 12, a plurality of driving wheels being provided upon each side thereof and all the driving wheels upon each side being connected together so that the front and rear driving wheels may be driven positively from and in unison with the central wheels upon each side, which central wheels are driven by driving axles 13 supported in bearings 14 provided in axle housings 15 supported from the main frame of the machine.

The driving axles 13 are driven from the engine 11 independently of one another, and through transmission mechanism to be hereinafter described in detail and claimed; while the front and rear driving wheels are supported by axles 16 which in turn are supported from the main frame 10, but which axles are themselves not driven directly by the transmission mechanism. Oppositely disposed driving wheels like the two front or the two rear ones are loose relative to one another and to the axles whereby they are supported; the preferred scheme or plan being to secure one such wheel tight upon its axle so as to cause the axle to rotate in its bearings and with the wheel, and to support the opposite wheel loose upon the axle so that it may rotate upon but independently of the axle in question. The driving wheels may be of any selected construction, although they are preferably hollow as shown, and comprise ribbed end walls or heads 17, 18, the latter having an opening closed by a cover 19, and a peripherally extending band or rim 20 secured to said end walls.

Motion is communicated to the driving wheels upon each side of each central driving wheel through the links 21, 22, 23, 24; the links 21, 23 being pivotally connected with the wheels at 25, through suitable wrist pins, and with one another at 26, to thereby permit vertical movements of the front and rear supporting axles 16 without straining the links; while the links 22 and 24 are similarly pivotally connected with one another at 27, and with the free ends of arms 28 supported from the wrist pins carried by the wheels at the points 29 through suitable wrist pins carried by the arms, the wrist pins, the arms and the wheel in each instance forming a unitary and rigid structure; thus providing for the driving of the front and rear driving wheels, upon both sides of the tractor as will be appreciated, from the central driving wheels and in unison therewith, and without dead centers, because of the fact that the ends of the driving links are connected with each several wheels at two points 90 degrees apart.

Figure 3:
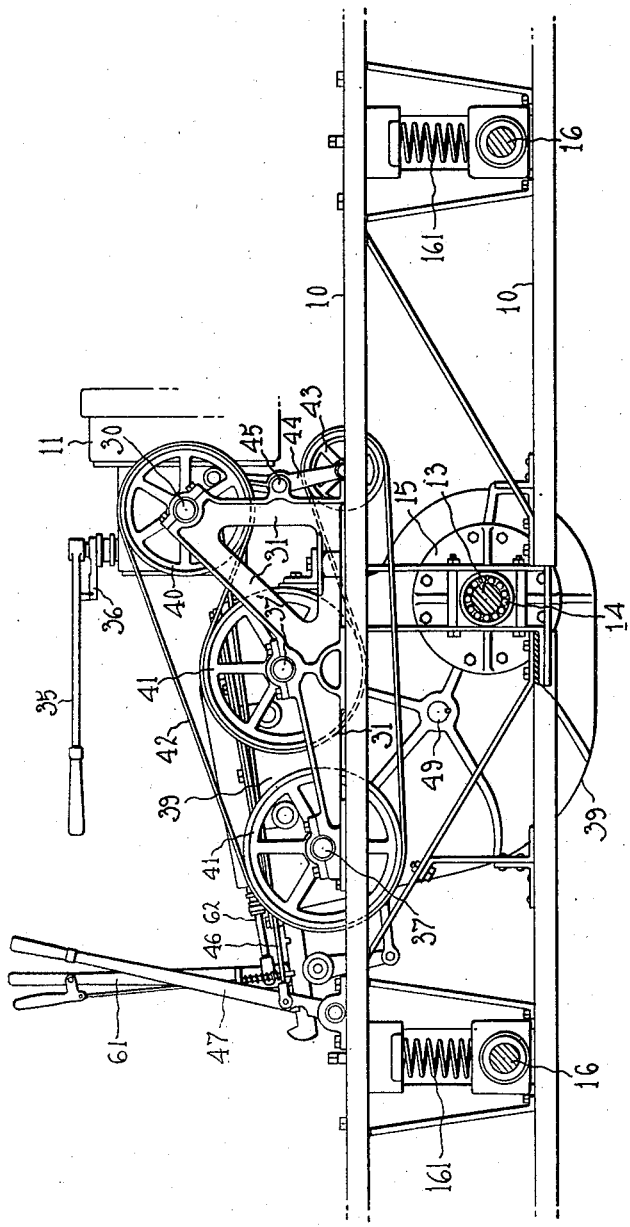
Figure 3 is a fragmentary view showing certain elements of the transmission mechanism in side elevation.

The axles whereby the pairs of front and rear driving wheels are supported are themselves supported from the frame 10 through springs 161 the resistance of which is such that the middle driving wheels will normally be held up and out of contact with the ground, the axles 13 of the middle driving wheels being at a somewhat higher level than the axles 16, 16 of the two end pairs of driving wheels, as shown in Figures 1 and 3; from which it follows that the frame and the elements carried thereupon will be spring supported upon the axles of the end pairs of driving wheels, and that the tractor will operate upon hard ground or upon roads as a four-wheel tractor, the middle driving wheel being out of contact with the ground under the conditions assumed; while if the tractor is operating upon soft ground the pairs of end driving wheels will sink thereinto to an extent sufficient to bring the middle driving wheels into engagement with the ground, in which last mentioned case all six wheels will act as driving wheels, and increased tractive effort will be secured because of the increased area of contact which follows the engagement of the middle driving wheels with the surface upon which the tractor is operating.

The reference numeral 30 designates a driving shaft extending transverse to the tractor and the ends of which are supported in bearings carried by upright frames 31 supported by the side member of the frame 10 and which shaft is driven by a clutch member 32 slidable upon the said shaft, and having teeth upon its two ends adapted to engage and interlock with teeth upon one or the other of two bevel gears 33, 33 freely rotatable upon the shaft 30, and which gears are driven by a third bevel gear 34 which in turn is driven from the engine 11; from which it follows that the said driving shaft may be rotated in either a forward or in a reverse direction from the engine by shifting the clutch member 32 into one or the other of its two extreme positions in which the teeth thereof engage one or the other of the gears 33; the gear not so engaged and interlocked with the clutch then rotating freely upon the shaft, as will be appreciated. The clutch member 32 is shifted by a lever 35 secured to a shaft having a yoke or equivalent member adapted to engage the clutch member and move it sidewise into one or the other of its two extreme positions, as is usual in such devices, and a notched sector 36 is commonly provided for locking the shifting lever and clutch in whatever position it may be placed in and in a position such as to secure the desired operation of the transmission mechanism through which the tractor is driven.

Also extending transverse to the tractor in the embodiment of my invention illustrated are two pairs of driven shafts, the two shafts of the pair to the right of the center line of the vehicle being designated by the reference numerals 37, 37' while those upon the left of the center are designated by the numerals 38, 38'. The outer ends of these driven shafts are supported in bearings in the frames or brackets 31, while the inner ends thereof are supported in bearings in the side walls of a gear housing 39 within which the transmission gearings to be presently described are located, and to which the inner ends of the axle housings 15 are secured.

The driving shaft 30 is provided with two driving pulleys 40, 40' located one adjacent each end thereof, and each of the four driven shafts 37, 37' and 38, 38' is provided with a driven pulley 41 secured adjacent its outer end. Two belts 42, 42', one disposed upon each side of the center of the tractor in the embodiment of my invention disclosed herein, extend one about each of the driving pulleys 40 and then in opposite directions about the two driven pulleys 41, 41 at the free ends of the driven shafts, 37, 37' and 38, 38' from which it follows that the individual shaft of each pair of driven shafts 37, 37' and 38, 38' will be driven in opposite directions from the driving shaft 30 through the belts 42, 42'. This will happen whichever way the driving shaft 30 is rotating, although the direction of rotation of any particular driven shaft is of course reversed with a reversal of the direction of rotation of the driving shaft following a movement of the lever 35 from one to the other of its extreme positions.

The belts 42, 42' are of such lengths that they are normally loose upon the driving and driven pulleys, and belt tightening pulleys 43, 43' carried by levers 44, 44' pivotally supported from the frames or brackets 31 as shown at 45 in Figure 3 engage loops provided by the looseness of the belts, as best shown in Figures 1 and 3 of the drawings. The levers 44, 44' are operated by rods 46, 46' extending between them and hand operated levers 47, 47' whereby when said belt tighteners are swung so as to tighten the belts the driven shafts will be operated from the driving shaft, the shafts of each pair of driven shafts being driven in opposite directions, while if the tighteners are left or moved so as to loosen the belts, then the driven shafts will not be operated. Obviously, and for the purpose of operating the driving wheels 12 upon one side only of the tractor, either belt tightener may be manipulated independently of the other and both pairs or only one pair of driven shafts 37, 37' or 38, 38' operated at a given time; and one pair of driven shafts may by driven slower than the other, if desired, by so manipulating one of the belt tighteners as to permit slipping in one of the belts.

Secured to the inner ends of the driving axles 13 are gears 48, 48' whereby said axles are driven, and 49 designates a shaft the ends of which are supported in bearings in the side walls of the transmission gear housing 39 and upon which shaft two combined gears and pinions 50, 51, 50', 51' are freely rotatable; the pinions 51, 51' being in gear with the gears 48, 48' so that the axles may be driven from the gears 50, 50', each independently of the other, as will be appreciated.

The gears 50, 50' are driven each from its associated pair of driven shafts 37, 37' or 38, 38', and by either one or the other of the individual shafts of the pair of shafts associated with it; to which end each driven shaft is provided with a pinion slidable along the same and into and out of mesh with said gears 50, 50'. Thus the driven shafts 37, 37' are provided with pinions 52, 52' slidable along the same but always in driving engagement therewith, as through a key and a key-way connection, which pinions are movable laterally so that either one of them, but not both at the same time, may be moved into mesh with the gear 50 through which the right hand driving axle 13 is driven; from which it follows that the said axle may thus be driven in either a forward or a reverse direction, for the driven shafts 37, 37' are rotated in opposite directions through the belts, as hereinbefore explained. Likewise the gear 50' is operated in either a forward or in a reverse direction from one or the other of the driven shafts 38, 38' by pinions 53, 53' slidable along but always in non-rotary engagement with said shafts, and either of which may be moved into mesh with the said gear to the exclusion of the other.

Figure 2:
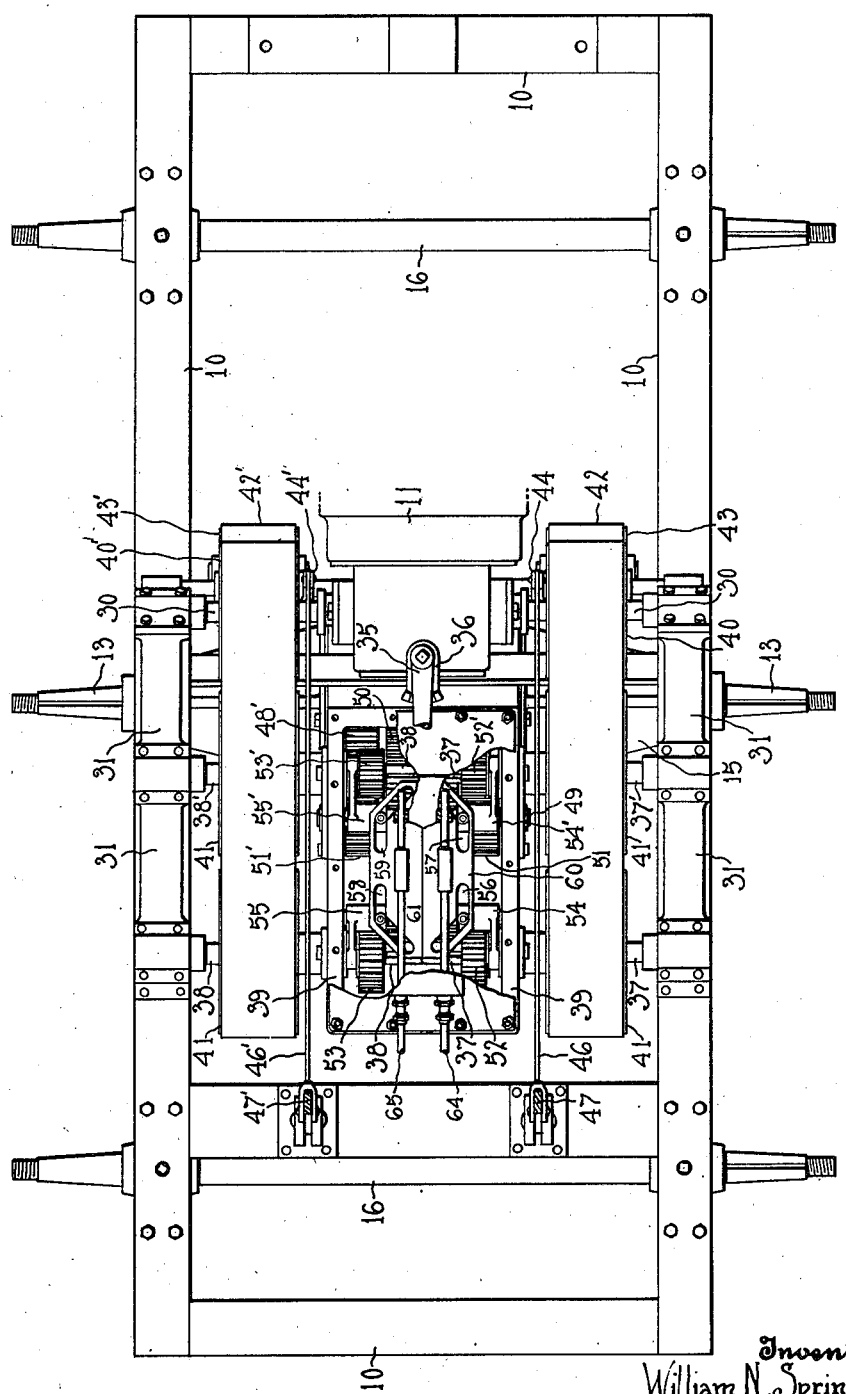
Figure 2 is a view showing the main frame of the tractor, and the transmission mechanism through which the driving wheels are driven, in plan.

The several pinions 52, 52' and 53, 53' are moved along the separate shafts of the two pairs of driving shafts 37, 37' and 38, 38' by means of yokes 54, 54' and 55, 55' associated one with each pinion, and which yokes are slidable along two shafts the ends of which are supported in the side walls of the transmission gear casing 39; said yokes having each an arm extending into a groove in the hub of the pinions in question, and a pin extending into slots 56, 57, 58, 59 provided two in each of two slidable gear shifting plates 60, 61 arranged side by side in the upper portion of the transmission gear casing 39, as best shown in Figure 2.

The gear shifting plates 60, 61 are operated by levers 62, 63 which are operatively connected one with each of said plates through bars or rods 64, 65; each plate having its own individual operating lever so that either may be moved independently of the other; and it will be appreciated, bearing in mind the foregoing description of the transmission gearing, that movement of either one of the said plates from the central position in which they are shown, forward, or toward the right, will be accompanied by a movement of the rearmost or left hand pinion 52 or 53, according to which plate is moved, inward and into mesh with the driving gear 50 or 50' with which the pinion thus moved is adapted to mesh, while movement of the plate thus moved rearward from its central position will be accompanied by a movement of the corresponding forward or right hand pinion 52' or 53' inward and into mesh with the driving gear 50 or 50' with which the plate in question cooperates. Movement of either one of the gear shifting plates from either of its extreme positions into the central position in which the plates are shown obviously moves whichever pinion is then in mesh with a driving gear 50 or 50' out of mesh therewith, and leaves both pinions controlled by the plate thus moved out of mesh with the driving gear with which the plate is associated.

From the above description it will be appreciated that the driving wheels upon one side of the tractor may be driven in a direction to move the tractor forward by so shifting say the plate 60 as to cause the pinion 52 or 52' upon the one of the driven shafts 37, 37' which is being driven forwardly to mesh with the driving gear 50, while the driving wheels upon the other side of the tractor may at the same time be driven in a reverse direction to thereby move the tractor backward by shifting the plate 61 so as to cause the pinion 53' or 53 upon the driven shaft 38' or 38 which is being driven in a reverse direction to mesh with the driving gear 50'. This capability of simultaneously driving the driving wheels upon one side of the tractor forward, and those upon the other side of the tractor backward, provides a tractor which may be turned around within an exceedingly short space, and one in which the direction of travel may be quickly varied throughout a wide range, as will be understood.

The front and rear driving pinions of each pair of pinions 52, 52' and 53, 53' are preferably made of different diameters, as shown in Figure 5, which feature, in connection with the capability of reverse movement inherent in the driving shaft 30 and shifting plates 60, 61, provides for the driving of the tractor at two speeds in a forward and at two speeds in a reverse direction; as the same may be operated by either the larger or the smaller of the gears in question, and said gears may be driven in either direction from driving shaft 30.

The driving action of the driving wheels 12 upon either side of the tractor may be obviously interrupted by loosening the belt tightening device upon the side of the machine, thus securing driving action from the wheels upon the other side of the tractor and a short turning of the same, or turning at an angle more acute than would be the case if the wheels upon both sides of the tractor were acting to drive the same; and obviously an even shorter turning action may be secured by manipulating the gear shifting plates 60, 61 as above explained and so as to secure forward driving from one pair of driven shafts 37, 37' or 38, 38' upon one side of the tractor, and rearward driving from the other pair of shafts upon the other side.

In order to secure a better grip of the driving wheels upon the ground or roadway along which the tractor is moving and a greater tractive effort or draw bar pull the said wheels are commonly provided with cleats comprising centrally disposed bars 66 curved to conform with the periphery of the wheel and extending circumferentially thereof, and which bars are provided each with spaced lugs 67 at one end and tongue 68 at the other, said last mentioned elements being perforated to receive bolts whereby the cleats may be connected one with another throughout the circumference of the wheel as will be appreciated from Figures 1, 4 and 5 wherein the cleats are shown as applied to one of the driving wheels for a portion of its periphery. These cleats also include cross bars 69 the ends of which extend to the sides of the wheel and are there provided with inwardly extending lugs 70 having holes through which stud bolts or cap screws may extend into threaded openings 71 in the heads 17, 18 of the wheels, to thereby hold the cleats in place upon and to the periphery of the wheel.

Having thus described and explained my invention, I claim and desire to secure by Letters Patent:

1. In a self-propelled vehicle of the class described, a driving shaft; a motor operatively connected with said shaft; two pairs of driven shafts, the individual shafts of each pair being parallel and spaced apart from one another; means whereby the individual shafts of each pair of driven shafts are driven simultaneously and in opposite directions from and by said driving shaft; driving wheels located one upon either side of the vehicle; and gearing whereby and through which each driving wheel may be driven from either one of the driven shafts of one of said pairs of driven shafts.

2. In a self-propelled vehicle of the class described, a driving shaft; a motor operatively connected with said shaft; two driven shafts; pulleys carried by said driving and driven shafts; a belt connecting said pulleys and through which both said driven shafts are driven from said driving shaft, and which belt extends about the pulleys carried by said driven shafts in opposite directions to thereby rotate said shafts in opposite directions; a driving wheel; and gearing whereby and through which said driving wheel may be driven from either one of said driving shafts.

3. In a self-propelled vehicle of the class described, a transversely extending driving shaft; a motor; reversing mechanism through which said driving shaft may be driven from said motor and either in a forward or reverse direction; two transversely extending driven shafts arranged in line with one another and having each a pulley; two belts each extending about a pulley upon said driving shaft and the pulley carried by one of said shafts, and whereby said driven shafts are driven one from each of the pulleys carried by said driving shaft; two belt tightening devices associated one with each of said belts; driving wheels located one upon either side of the vehicle; and gearing whereby and through which said driving wheels may be driven one from each of said driven shafts, and each independently of the other.

4. In a self-propelled vehicle of the class described; a driving shaft; a motor; reversing mechanism through which said driving shaft may be driven from said motor and either in a forward or a reverse direction; two pairs of driven shafts the individual shafts of each pair being parallel and spaced apart from one another; means whereby the individual shafts of each pair of driven shafts are driven simultaneously and in opposite direction from and by said driving shaft; driving wheels located one upon either side of the vehicle; and gearing whereby and through which each driving wheel may be driven from either one of the driven shafts of one of said pairs of driven shafts.

5. In a self-propelled vehicle of the class described, a driving shaft; a motor; reversing mechanism through which said driving shaft may be driven from said motor and either in a forward or a reverse direction; two driven shafts; pulleys carried by said driving and driven shafts; a belt connecting said pulleys and through which both said driven shafts are driven from said driving shaft, and which belt extends about the pulleys carried by said driven shafts in opposite directions to rotate said shafts in opposite directions; a driving wheel; two pinions carried one by each of said driven shafts; and gearing through which said driving wheel may be driven from either one of said pinions.

6. In a self-propelled vehicle of the class described, a transversely extending driving shaft; a motor operatively connected with said shaft; two transversely extending driven shafts; pulleys carried by said driving and driven shafts; a belt connecting said pulleys and through which both said driven shafts are driven from said driving shaft, and which belt extends about the pulleys carried by said driven shafts in opposite directions to thereby rotate said shafts in opposite directions; a driving wheel; and gearing whereby and through which said driving wheel may be driven from either one of said driven shafts.

7. In a self-propelled vehicle of the class described; a transversely extending driving shaft having two driving pulleys secured one adjacent each of its ends; a motor operatively connected with said shaft; two pairs of driven shafts each of which shafts is provided with a pulley adjacent its outer end, and with a driving pinion adjacent its inner end; two driving belts one extending about the driving pulley at one end of said driving shaft, and then in opposite directions about the pulleys at the outer ends of the two shafts of one of said pairs of driven shafts, to thereby rotate the individual shafts of each pair of driven shafts in opposite directions; driving wheels located one upon either side of the vehicle; and two gears one operatively connected with each of the driving wheels, and each of which gears may be operated by either one of the pinions aforesaid carried by and located at the inner ends of the shafts of one of said pairs of driven shafts.

8. In a self-propelled vehicle of the class described, a transversely extending driving shaft; a motor; reversing mechanism through which said driving shaft may be driven from said motor and either in a forward or a reverse direction; two driving pulleys secured to said driving shaft; two pairs of driven shafts each of which shafts is provided with a pulley, and with a driving pinion; two driving belts each extending about a driving pulley of said driving shaft, and then in opposite directions about the pulleys upon the two shafts of one of said pairs of driven shafts, to thereby rotate individual shafts of each pair of driven shafts in opposite directions; driving wheels located one upon either side of the vehicle; and two gears one operatively connected with each of said driving wheels and which gears may be driven one by either one of the pinions aforesaid of the shafts which constitute one of said pairs of driven shafts, and the other by either one of the pinions aforesaid of the shafts of the other said pairs of driven shafts.

9. In a self-propelled vehicle of the class described, a transversely extending driving shaft; a motor, reversing mechanism through which said driving shaft may be driven from said motor and either in a forward or reverse direction; two driving pulleys secured to said driving shaft; two pairs of driven shafts each of which shafts is provided with a pulley; two driving pinions one driven by and slidable along each driven shaft; two driving belts each extending about a driving pulley of said driving shaft, and then in opposite directions about pulleys upon the two shafts of one of said pairs of driven shafts, to thereby rotate the individual shafts of each pair of driven shafts in opposite directions; driving wheels located one upon either side of the vehicle; two gears one operatively connected with each of said driving wheels; and means for sliding the driving pinions aforesaid into and out of driving engagement with said gears.

10. In a self-propelled vehicle of the class described, a driving shaft; a motor operatively connected with said driving shaft; two pairs of driven shafts the individual shafts of each pair being parallel and spaced apart from one another; means whereby the individual shafts of each pair of driven shafts are driven simultaneously and in opposite directions from and by said driving shaft; driving wheels located one upon either side of the vehicle; gearing through which either one of said driving wheels may be driven from either one of the driven shafts of one of said pairs of driven shafts and either in a forward or in a reverse direction; and gearing separate and independent of said first mentioned gearing, and through which the other of said driving wheels may be driven from either one of the driven shafts of the other of said shafts, and either in a forward or in a reverse direction.

11. In a self-propelled vehicle of the class described, a driving shaft; two driven shafts; means whereby said driven shafts are driven by said driving shaft; driving wheels located one upon either side of the vehicle; two pinions, one associated with each of said driven shafts, and which pinions are slidable upon said shaft; two driving gears one operatively connected with each of said driving wheels; and two sliding gear shifting plates, one operatively connected with each of the pinions aforesaid, and whereby said pinion may be moved into and out of mesh with said driving gear.

12. In a self-propelled vehicle of the class described, a driving shaft; a motor operatively connected with said shaft; two pairs of driven shafts; means whereby the individual shafts of each pair of driven shafts are driven in opposite direction from said driving shafts; driving wheels located one upon either side of the vehicle; two driving gears one operatively connected with each of said driving wheels; pinions carried by and slidable one upon each of said driving shafts; shifting plates one operatively connected with the two pinions of one of said driven shafts and adapted to move one or the other of said pinions into mesh with one of the driving gears aforesaid, and the other operatively connected with the two pinions of the other of said pairs of driven shafts and adapted to move one or the other of the other said pinions into mesh with the other of said driving gears.

13. In a self-propelled vehicle of the class described, a driving shaft; a pulley carried by said shaft; two driven shafts; two pulleys carried one by each of said driven shafts; a belt extending about the pulley upon said driving shaft and in opposite directions about the two pulleys carried by said driven shafts; a belt tightening device cooperating with said belt; a driving wheel; and means whereby and through which said driving wheel may be driven by and from either one of the said driven shafts.

14. In a self-propelled vehicle of the class described, a motor; six driving wheels located three upon one and three upon the other side of said vehicle; means whereby and through which the central driving wheels may be driven each independently of the other and either in a forward or in a reverse direction, from said engine; and a plurality of links intermediate each central wheel and the wheels upon each side thereof, and through which said side wheels are driven from and in unison with said central wheels.

15. In a self-propelled vehicle of the class described, a motor; two central driving wheels located one upon either side of the vehicle, two other driving wheels upon either side of the vehicle and located one in front and the other to the rear of said driving wheels, and the axes of which last mentioned wheels are above the level of the axes of said central driving wheels; means whereby and through which said driving wheels are driven from said motor; and means through which the driving wheels located in front and behind said central driving wheels are driven from said central driving wheels.

16. In a self-propelled vehicle of the class described, a motor; six driving wheels, three upon one and three upon the other side of the vehicle, and the central ones of which driving wheels are disposed higher than the end driving wheels, so that the end driving wheels will normally serve to support the vehicle; means whereby and through which the central driving wheels may be driven from said motor; and means whereby and through which the end driving wheels on each side of the vehicle may be driven from said central driving wheels.

17. In a tractor, the combination of a frame, traction means mounted on each side thereof, a power shaft, independent transmission mechanisms between said shaft and the traction means, each of said mechanisms including a single belt drive and gearing connecting said belt drive to the traction means on the corresponding side of the frame and forward and reverse driving mechanism between the power shaft and each of said transmission mechanisms.

18. In a tractor, the combination of a frame, traction means mounted on each side thereof, a power shaft, independent transmission mechanisms for the traction means on each side, each of said mechanisms including a single belt and means operated by said power shaft for independent forward, neutral and reverse drive of said belts.

19. In a tractor, the combination of a frame, traction means mounted on each side thereof, a power shaft, independent transmission mechanisms between said shaft and the traction means, each of said mechanisms including a single belt drive and change speed gearing connecting said belt drive to the traction means on the corresponding side of the frame, and means operated by said power shaft for independent forward, neutral or reverse drive of said belts.

20. In a tractor, the combination of a frame, traction means at each side thereof, a power shaft, independent transmission mechanism between said shaft and the traction means, each of said mechanisms including a single belt drive, means co-operating with said belt drive for varying the speed of said tractor and forward and reverse driving mechanism between said power shaft and each of said transmission mechanisms.

In testimony whereof I affix my signature.

WILLIAM N. SPRINGER.